(12) United States Patent
Masuo

(10) Patent No.: US 7,853,761 B2
(45) Date of Patent: Dec. 14, 2010

(54) CLASSIFYING WRITE COMMANDS INTO GROUPS BASED ON CUMULATED FLUSH TIME

(75) Inventor: Tomonori Masuo, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 11/957,840

(22) Filed: Dec. 17, 2007

(65) Prior Publication Data
US 2008/0162803 A1 Jul. 3, 2008

(30) Foreign Application Priority Data
Dec. 27, 2006 (JP) ............................. 2006-353035

(51) Int. Cl.
*G06F 13/22* (2006.01)
(52) U.S. Cl. ................ 711/158; 711/113; 711/E12.019
(58) Field of Classification Search .................. 711/112
See application file for complete search history.

(56) References Cited

U.S. PATENT DOCUMENTS 6,571,298 B1 * 5/2003 Megiddo ........................ 710/5

2003/0225969 A1 * 12/2003 Uchida et al. ............... 711/112
2006/0080501 A1    4/2006 Auerbach et al.
2007/0067562 A1 *  3/2007 Ohsaki et al. ............... 711/113
2008/0024899 A1 *  1/2008 Chu et al. ..................... 360/69

FOREIGN PATENT DOCUMENTS

| JP | 05-250274 | 9/1993 |
| JP | 06-309234 | 11/1994 |
| JP | 2006-114206 | 4/2006 |

* cited by examiner

*Primary Examiner*—Matt Kim
*Assistant Examiner*—Hal Schnee
(74) *Attorney, Agent, or Firm*—Pillsbury Winthrop Shaw Pittman, LLP

(57) ABSTRACT

According to one embodiment, a magnetic disk apparatus comprises a volatile memory for storing write commands and data accompanying the commands supplied from a host system, and a flush control unit for classifying the write commands into a first group of commands and a second group of commands based on a time required to write the data accompanying the commands on a magnetic disk, writing the data accompanying the first group of commands to the magnetic disk, and writing the second group of commands and the data accompanying the second group of commands to a nonvolatile memory.

4 Claims, 5 Drawing Sheets

Distribution of the commands

| Index (M_index) (F_index) | CMD | Writing on the disk | | Writing in the memory | |
|---|---|---|---|---|---|
| | | Time | Total Time | Total Time | Time |
| 0 | 4(E) | 2ms | 2ms | 1ms | 16ms |
| 1 | 8(I) | 5ms | 7ms | 1ms | 15ms |
| 2 | 7(H) | 3ms | 10ms | 3ms | 14ms |
| 3 | 1(B) | 8ms | 18ms | 2ms | 11ms |
| 4 | 0(A) | 10ms | 28ms | 1ms | 9ms |
| 5 | 9(J) | 2ms | 30ms | 2ms | 8ms |
| 6 | 6(G) | 5ms | 35ms | 1ms | 6ms |
| 7 | 5(F) | 2ms | 37ms | 2ms | 5ms |
| 8 | 2(C) | 3ms | 40ms | 2ms | 3ms |
| 9 | 3(D) | 3ms | 43ms | 1ms | 1ms |

Disk process : E → I → H
Memory process : D, C, F, G, J, A, B

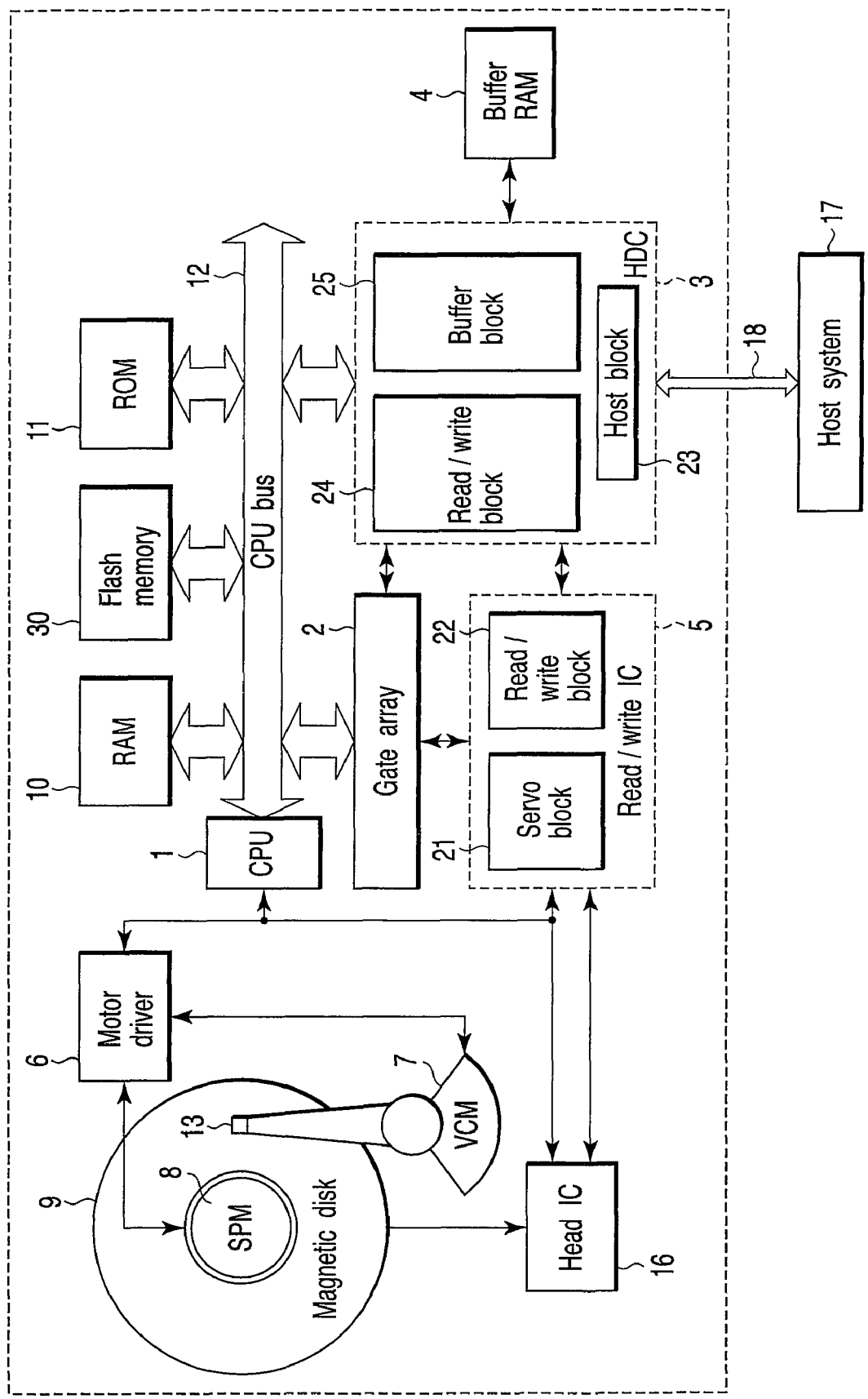
F I G. 1

FIG. 2A

Command queuing

| Index | CMD |
|---|---|
| 0 | A |
| 1 | B |
| 2 | C |
| 3 | D |
| 4 | E |
| 5 | F |
| 6 | G |
| 7 | H |
| 8 | I |
| 9 | J |
| 10 | Not registered |
| ... | ... |

FIG. 2B

Calculation of the disk-process time

| Index (M_index) | CMD | Writing on the disk Time | Total Time |
|---|---|---|---|
| 0 | 4(E) | 2ms | 2ms |
| 1 | 8(I) | 5ms | 7ms |
| 2 | 7(H) | 3ms | 10ms |
| 3 | 1(B) | 8ms | 18ms |
| 4 | 0(A) | 10ms | 28ms |
| 5 | 9(J) | 2ms | 30ms |
| 6 | 6(G) | 5ms | 35ms |
| 7 | 5(F) | 2ms | 37ms |
| 8 | 2(C) | 3ms | 40ms |
| 9 | 3(D) | 3ms | 43ms |

FIG. 2C

Calculation of the flash-memory-process time

| Index (M_index) (F_index) | CMD | Writing on the disk Time | Total Time | Writing in the memory Time | Total Time |
|---|---|---|---|---|---|
| 0 | 4(E) | 2ms | 2ms | 1ms | 16ms |
| 1 | 8(I) | 5ms | 7ms | 1ms | 15ms |
| 2 | 7(H) | 3ms | 10ms | 3ms | 14ms |
| 3 | 1(B) | 8ms | 18ms | 2ms | 11ms |
| 4 | 0(A) | 10ms | 28ms | 1ms | 9ms |
| 5 | 9(J) | 2ms | 30ms | 2ms | 8ms |
| 6 | 6(G) | 5ms | 35ms | 1ms | 6ms |
| 7 | 5(F) | 2ms | 37ms | 2ms | 5ms |
| 8 | 2(C) | 3ms | 40ms | 2ms | 3ms |
| 9 | 3(D) | 3ms | 43ms | 1ms | 1ms |

FIG. 2D

Distribution of the commands

| Index (M_index) (F_index) | CMD | Writing on the disk Time | Total Time | Writing in the memory Time | Total Time |
|---|---|---|---|---|---|
| 0 | 4(E) | 2ms | 2ms | 1ms | 16ms |
| 1 | 8(I) | 5ms | 7ms | 1ms | 15ms |
| 2 | 7(H) | 3ms | 10ms | 3ms | 14ms |
| 3 | 1(B) | 8ms | 18ms | 2ms | 11ms |
| 4 | 0(A) | 10ms | 28ms | 1ms | 9ms |
| 5 | 9(J) | 2ms | 30ms | 2ms | 8ms |
| 6 | 6(G) | 5ms | 35ms | 1ms | 6ms |
| 7 | 5(F) | 2ms | 37ms | 2ms | 5ms |
| 8 | 2(C) | 3ms | 40ms | 2ms | 3ms |
| 9 | 3(D) | 3ms | 43ms | 1ms | 1ms |

Disk process : E → I → H
Memory process : D, C, F, G, J, A, B

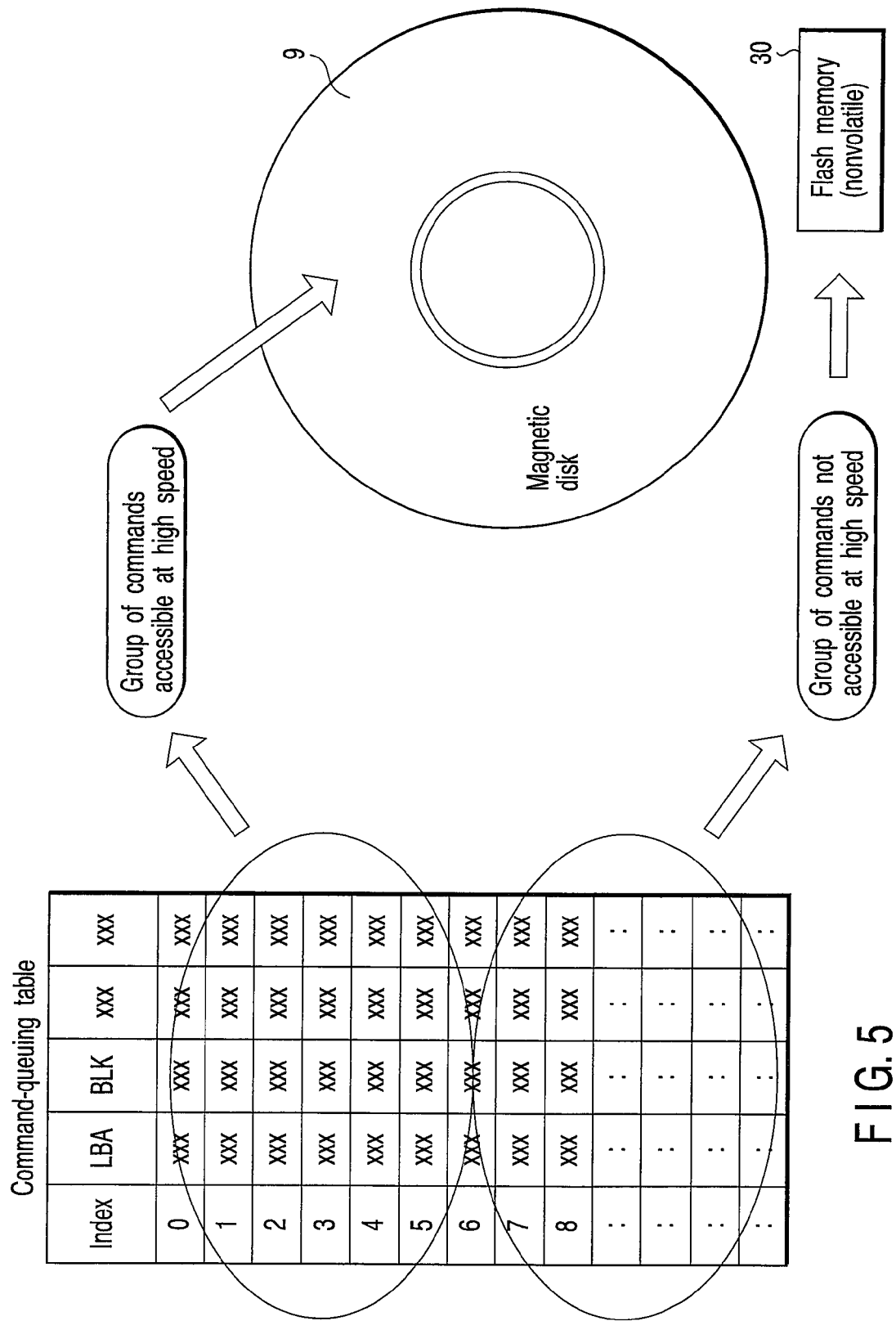
F I G. 5

US 7,853,761 B2

CLASSIFYING WRITE COMMANDS INTO GROUPS BASED ON CUMULATED FLUSH TIME

CROSS-REFERENCE TO RELATED APPLICATIONS

This application is based upon and claims the benefit of priority from Japanese Patent Application No. 2006-353035, filed Dec. 27, 2006, the entire contents of which are incorporated herein by reference.

BACKGROUND

1. Field

One embodiment of the present invention relates to a magnetic disk apparatus that has a cache memory for caching write commands, and to a method of controlling such a magnetic disk apparatus.

2. Description of the Related Art

Various magnetic disk apparatuses, each comprising a cache memory to increase the access speed, have been developed in recent years (see, for example, Jpn. Pat. Appln. KOKAI Publication No. 6-309234, paragraphs 0002 to 0005). The cache memory is a high-speed buffer storage device that temporarily stores data exchanged between a host computer and a magnetic disk apparatus. It stores a copied part of the data recoded on a magnetic disk. Cache memories usually used are high-speed semiconductor memories such as SRAMs or DRAMs.

In a magnetic disk apparatus having a cache memory, a write command and data are temporarily stored in the cache memory (write cache) when the host computer issues a write-access request to the magnetic disk apparatus. The cache memory can register (queue) many commands. The number of commands the cache memory can register is limited, nonetheless. The write commands stored in the cache memory must therefore be written on the magnetic disk (write flush). In most cases, the data is written on the disk when the write-flush request is issued from the host computer. Alternatively, even if no write-flush requests have been issued from the host computer, the magnetic disk apparatus may determine how busy the data processing is, and the contents of the cache memory may be written on the disk while the data processing is not busy.

If a cache memory is so used in the magnetic disk apparatus, the number of times the mechanical driving is performed to access the magnetic disk apparatus will decrease. This can indeed greatly increase the apparent speed of accessing the magnetic disk apparatus. However, the mechanical driving must be performed to accomplish the write-flush. Consequently, the time required for accessing the magnetic disk apparatus cannot be shorted so much as is desired. It takes about tens of milliseconds to write-flush one write command.

BRIEF SUMMARY OF THE INVENTION

According to an embodiment of the present invention, a magnetic disk apparatus comprises a magnetic disk; a nonvolatile memory; a volatile memory configured to store write commands and data accompanying the commands supplied from a host system; and a first flush control unit configured to classify the write commands into a first group of commands and a second group of commands based on a time required to write the data accompanying the commands on the magnetic disk, write the data accompanying the first group of commands to the magnetic disk, and write the second group of commands and the data accompanying the second group of commands to the nonvolatile memory.

According to another embodiment of the present invention, a control method for a magnetic disk apparatus comprising a magnetic disk, a nonvolatile memory, and a volatile memory configured to store write commands and data accompanying the commands supplied from a host system, the method comprises classifying the write commands into a first group of commands and a second group of commands based on a time required to write the data accompanying the commands on the magnetic disk; and writing the data accompanying the first group of commands to the magnetic disk, and write the second group of commands and the data accompanying the second group of commands to the nonvolatile memory.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing the configuration of a magnetic disk apparatus according to an embodiment of the present invention;

FIGS. 2A, 2B, 2C and 2D are exemplary diagrams explaining a sequence of formulating a command-queuing table;

FIG. 5 an exemplary diagram outlining the write-flush.

DETAILED DESCRIPTION

Figure 3:
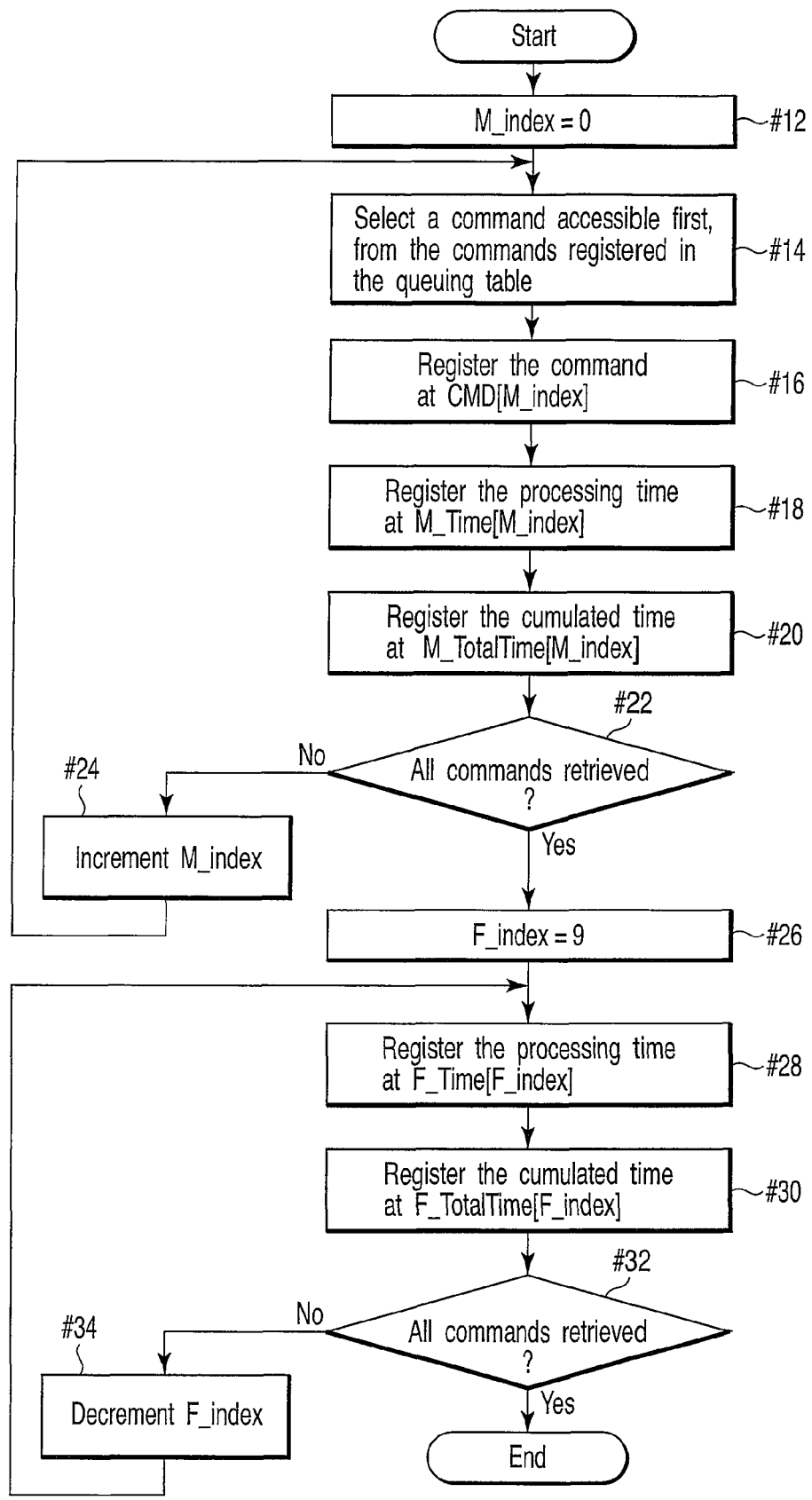
FIG. 3 is an exemplary flowchart explaining a sequence of steps of formulating the command-queuing table.

Various embodiments according to the invention will be described hereinafter with reference to the accompanying drawings. In general, according to one embodiment of the invention, a magnetic disk apparatus comprises a magnetic disk; a nonvolatile memory; a volatile memory configured to store write commands and data accompanying the commands supplied from a host system; and a first flush control unit configured to classify the write commands into a first group of commands and a second group of commands based on a time required to write the data accompanying the commands on the magnetic disk, write the data accompanying the first group of commands to the magnetic disk, and write the second group of commands and the data accompanying the second group of commands to the nonvolatile memory.

FIG. 1 shows an exemplary block diagram showing the configuration of a hard disk drive according to a first embodiment of the present invention. As FIG. 1 shows, the hard disk drive (a block enclosed by a dotted line) is connected to a host system 17 by, for example, an ATA (IDE) bus 18. The hard disk drive may be of the type incorporated in the housing of the host system, i.e., personal computer, or of the type arranged outside the housing of the host system 17.

In the hard disk drive, a CPU 1 controls a motor driver 6 and some other components of the hard disk drive, in time-division fashion. The hard disk drive has a magnetic disk 9. The upper side of the disk 9; for example, is a recording surface on which data can be magnetically recorded. A magnetic head 13 is arranged, facing the recording surface of the magnetic disk 9. The magnetic head 13 is used to write (record) data on the magnetic disk 9 and read (playback) data from the magnetic disk 9. The lower side (not shown) of the magnetic disk 13 is another recording surface. A head (not shown) similar to the head 13 is arranged, facing the other recording surface. It is assumed that, as shown in FIG. 1, the disk drive that has one disk 9 only. Nevertheless, it may have a plurality of disks that are laid one above another.

The motor driver 6 supplies a current to a spindle motor (SPM) 8 and a voice coil motor (VCM) 7 to drive these motors 7 and 8. The spindle motor 8 rotates the magnetic disk 9 at a constant speed. The voice coil motor 7 is used to move the magnetic head 13 to a position over a target track of the magnetic disk 9.

The CPU 1 incorporates a flash memory (not shown) and a RAM (not shown, either). The flash memory is a programmable nonvolatile memory that stores control programs the CPU 1 may execute. A part of the storage area of the RAM is used as work area.

A CPU bus 12 is connected to the CPU 1. To the CPU bus 12, a ROM 11, a RAM 10, a disk controller (HDC) 3, a gate array 2, and a flash memory 30 are connected. The ROM 11 stores programs the CPU 1 should execute. The RAM 10 may store variables and the like. The gate array 2 generates various signals the CPU 1 uses to accomplish controls.

The flash memory 30 is, for example, an electrically erasable programmable read-only memory (EEPROM) of NAND type. The flash memory 30 can keep storing data even if it is not supplied with electric power. The flash memory 30 is therefore fit for storing data for a long time, unlike the RAM incorporated in the CPU 1 and the RAM 10. In this embodiment, the flash memory 30 is used to store data other than the data that is recorded on the disk 9. Nevertheless, the flash memory 30 is used to store a part of the data recorded on the disk 9, like the RAM 10, in order to raise the access speed.

A part of the memory space of the CPU 1 is allocated to a control register that controls the hard disk controller (HDC) 3 and the gate array 2. The CPU 1 reads and writes data from and into that part of the memory space, controlling the hard disk controller 3 and the gate array 2.

The hard disk drive has a read/write IC 5, which comprises two major components, i.e., a servo block 21 and a read/write block 22. The servo block 21 processes signals to position the magnetic head 13. The read/write block 22 processes signals to write and read data on and from the magnetic disk 9.

The magnetic disk 9 has regions (servo regions) and regions (data regions), which are alternately arranged at regular intervals. In the servo regions, servo data signals for positioning the head 13 are recorded. In the data regions, the data transferred from the host system is recorded. To position the magnetic head 13, an analog signal read by the magnetic head 13 is amplified by a head IC 16 and supplied to the read/write IC 5. In the read/write IC 5, the servo block 21 extracts servo data from the analog signal. The servo data is supplied to the gate array 2 and processed in the gate array 2. In accordance with the result of the processing the servo data, the CPU 1 controls the motor driver 6, which supplies the voice coil motor 7 with a current for positioning the magnetic head 13.

The hard disk controller 3 is connected not only to the CPU bus 12, but also to the gate array 2, a buffer RAM 4 and the read/write IC 5. The hard disk controller 3 comprises a host block 23, a read/write block 24 and a buffer block 25. The host block 23 that functions as interface with the host system 17. The buffer block 25 controls the buffer RAM 4. The read/write block 24 is connected to the read/write IC 5 and gate array 2 and reads and writes data.

The operation of the hard disk drive will be explained.

To read data, the magnetic head 13 reads an analog signal from the magnetic disk 9. The head IC 16 amplifies the analog signal. The analog signal amplified is decoded by the read/write IC 5. The hard disk controller 3 processes the decoded signal in accordance with control signals supplied from the gate array 2, generating data that should be transferred to the host system 17. The data is temporarily stored in the buffer RAM 4 and then transferred from the buffer RAM 4 to the host system 17.

To write data by the magnetic head 13, the data transferred from the host system 17 to the hard disk controller 3 is temporarily stored in the buffer RAM 4. Then, the data is sent from the hard disk controller 3 to the read/write IC 5 in accordance with the control signals supplied from the gate array 2. The read/write IC 5 encodes the data. The encoded data is supplied via the head IC 16 to the magnetic head 13. The magnetic head 13 writes the encoded data on the magnetic disk 9.

The host system 17 can send a SetFeature command or the like, rendering write cache on (valid) or off (invalid). If the write cache is valid, the write command the host system 17 has issued is registered in the command queuing table stored in the buffer RAM 4. The write command is composed of an address, a transfer block number, a buffer pointer, a physical address and the like. The data accompanying this command is registered in a data table stored also in the buffer RAM 4.

The data is erased in the buffer RAM 4 when the power switch of the hard disk drive is turned off. A process (known as write flush) should therefore be performed to write reliably the data registered in the data table, on the magnetic disk 9, in accordance with the write command registered in the command queuing table. To accomplish the write flush reliably, a Standby command, a Flush Cache command, and the like are prepared in the host system 17. If the host system 17 issues these commands, a write flush will be performed as described below.

In order to execute the write commands registered in the queuing table at high efficiency, accessible commands are retrieved (selected), while rearranging these commands in order. Then, the data registered in the data table, now in an optimal order, is recorded on the magnetic disk 9 (thus accomplishing the write flush). In the present invention, not only the magnetic disk 9, but also the flash memory 30 can be used to perform the write flush. It is therefore necessary to determine which command should be written flush in which medium (magnetic disk 9 or flash memory 30). The process of determining this is called command distributed processing. The data about the write command, written back into the flash memory 30, must be eventually written back onto the magnetic disk 9. Hence, not only the write command registered in the command queuing table, but also the data stored in the data table is written in the flash memory 30.

FIGS. 2A, 2B, 2C and 2D show the transition of the command queuing table. As can be understood from FIG. 2A, the command queuing table can register many commands. Assume that ten commands, i.e., command A, command B, command C, . . . and command J, are registered at present in the command queuing table.

The ten commands registered in the command queuing table are rearranged in the shortest possible time, based on the assumption that the data is first written back on only the magnetic disk 9. An example of a method of rearranging the ten commands is to retrieve a "command that can be processed fast" with a minimum motion of the head from the present position of the head. Such a command is retrieved in accordance with various conditions. In this embodiment, the "command that can be processed fast" is a command that is found to be processed faster than any other by moving the head from the present position, on the basis of the sum of the seek time, rotational delay time and medium-access time.

As a result, command E, command I, . . . command C and command D are arranged in the order mentioned, as illustrated in FIG. 2B. The new order is the order in which the ten write commands can be written back on the magnetic disk 9 in the shortest possible time. The new order is defined by disk-process order M_indices assigned to the ten commands, respectively. More precisely, disk-process order M_index 0 is assigned to command E to be processed first, disk-process order M_index 1 is assigned to command I to be processed next, and so forth. Thus, the disk-process order M_index assigned to each command is greater by one than that assigned to the preceding command. Note that the numeral put to each command shown in FIG. 2B is the initial order set when the command was registered in the command queuing table as shown in FIG. 2A. The processing time of each command is calculated from the transfer block in consideration of the seek time, the rotational delay time and the like and is registered in the command queuing table. Further, the time elapsed from the processing of the first command (i.e., command E in this instance) is registered in the table, too.

In the present invention, the write flush is performed not only by using the magnetic disk 9, but also by using the flash memory 30 if necessary. However, data cannot be written on the magnetic disk 9 before the seek time and the rotational delay time elapse. Inevitably, the data is written at a lower speed than into the flash memory 30. In view of this, a command assigned with a small disk-process order M_index and a command assigned with a large disk-process order M_index should be written flush on the magnetic disk 9 and in the flash memory 30, respectively. The processing time can thereby be shortened.

The time the flash memory 30 requires to store each command is registered, too, in order to determine which commands should be written flush on the magnetic disk 9 (or to determine the disk-process order M_index assigned to the last command to write flush). The time required for storing each of the ten commands into the flash memory 30 is calculated from the number of transfer blocks and is registered in the command queuing table. Any desired data can be written in the flash memory 30 in the very time required to record the data into the flash memory 30, because neither seek time nor rotational delay time involve in writing data into the flash memory 30. Moreover, the memory-write time measured backward from the processing of the command (i.e., command D in this case) assigned with the largest disk-process order M_index (i.e., 9) is also registered in the command queuing table, as shown in FIG. 2C. For the sake of explanation, the memory-process order F_index is assumed to be identical to the disk-process order M_index.

Next, the cumulated time for writing on the magnetic disk 9 will be compared with the cumulated time for writing in the flash memory 30 (see FIG. 2D). The cumulated time for writing on the magnetic disk 9 is retrieved, first for the command assigned with the smallest disk-process order M_index, whereas the cumulated time for writing in the flash memory 30 is retrieved, first for the command assigned with the largest memory-process order F_index. The commands assigned with large disk-process order M_indices are commands that cannot be written flush on the magnetic disc 9 at high speed. Therefore, they should better be written flush into the flash memory 30 in order to shorten the processing time, because neither seek time nor rotational delay time involve in writing data into the flash memory 30. Thus, the commands are retrieved in this sequence.

Write flush is performed by using a medium for which the time cumulated before each command is executed is short. In the case shown in FIG. 2D, commands E, I and H assigned with disk-process order M_indices 0 to 2, respectively, are written flush on the magnetic disk 9, and the commands D, C, F, G, J, A and B assigned with the disk-process order M_indices 9 to 3, respectively, are written flush in the flash memory 30. In order to minimize the processing time, commands E, I and H must be written flush in the order they are mentioned. The processing time does not change at all, in whichever order the commands D, C, F, G, J, A and B need are written flush.

The write flush on the magnetic disk 9 and the write flush in the flash memory 30 may be performed at the same time. In this case, only 11 milliseconds are required to accomplish write flush. If write flush is performed on the magnetic disk 9 only, 43 milliseconds will be required. If write flush is performed on two media at the same time, the overall write-flush time can be half. Hence, the write flush is completed in a short time. This prevents data destruction during the write flush, due to impacts or power-supply shutdown.

FIG. 3 is a flowchart explaining a sequence of steps of formulating the command-queuing table shown in FIG. 2A.

In block #12, the initial value of the disk-process order M_index is set to 0.

In block #14, from the commands registered at present (i.e., ten commands) in the command-queuing table, one command is selected, which can be processed faster than any other command, in consideration of the position the magnetic head 13 takes at present.

In block #16, the command selected in block #14 is registered at the (M_index)th CMD[M_index] in the queuing table (more precisely, a copy of the initial table).

In block #18, the processing time M_Time[M_index] of the command selected in block #14 is registered as the (M_index)th item in the queuing table.

In block #20, the cumulated time M_TotalTime[M_index] is updated by being added with the processing time of the command selected in block #14.

In block #22, it is determined whether all commands registered in the queuing table have been retrieved. If NO, the disk-process order M_index is incremented in block #24. The flow then returns to block #14. In block #14, the command that can be accessed faster than any other remaining command is selected.

In block #22, if it is determined that all commands have been retrieved (YES), the process goes to block #26. In block #26, the initial value of the memory-process order F_index is set to 9. Thus, commands will be written into the flash memory 30 in the order reverse to the order in which they are written on the magnetic disk 9.

In block #28, the time F_Time[F_index] required to process the (F_index)th command registered in the queuing table is calculated and registered.

In block #30, the cumulated time F_TotalTime[F_index] is updated by being added with the processing time of the preceding command calculated in block #28.

In block #32, it is determined whether all commands registered in the queuing table have been retrieved. If NO, the disk-process order F_index is decremented in block #34. The flow then returns to block #28, in which the processing time of the next command is registered.

In block #32, if it is determined that all commands have been retrieved (YES), the process is terminated.

Figure 4:
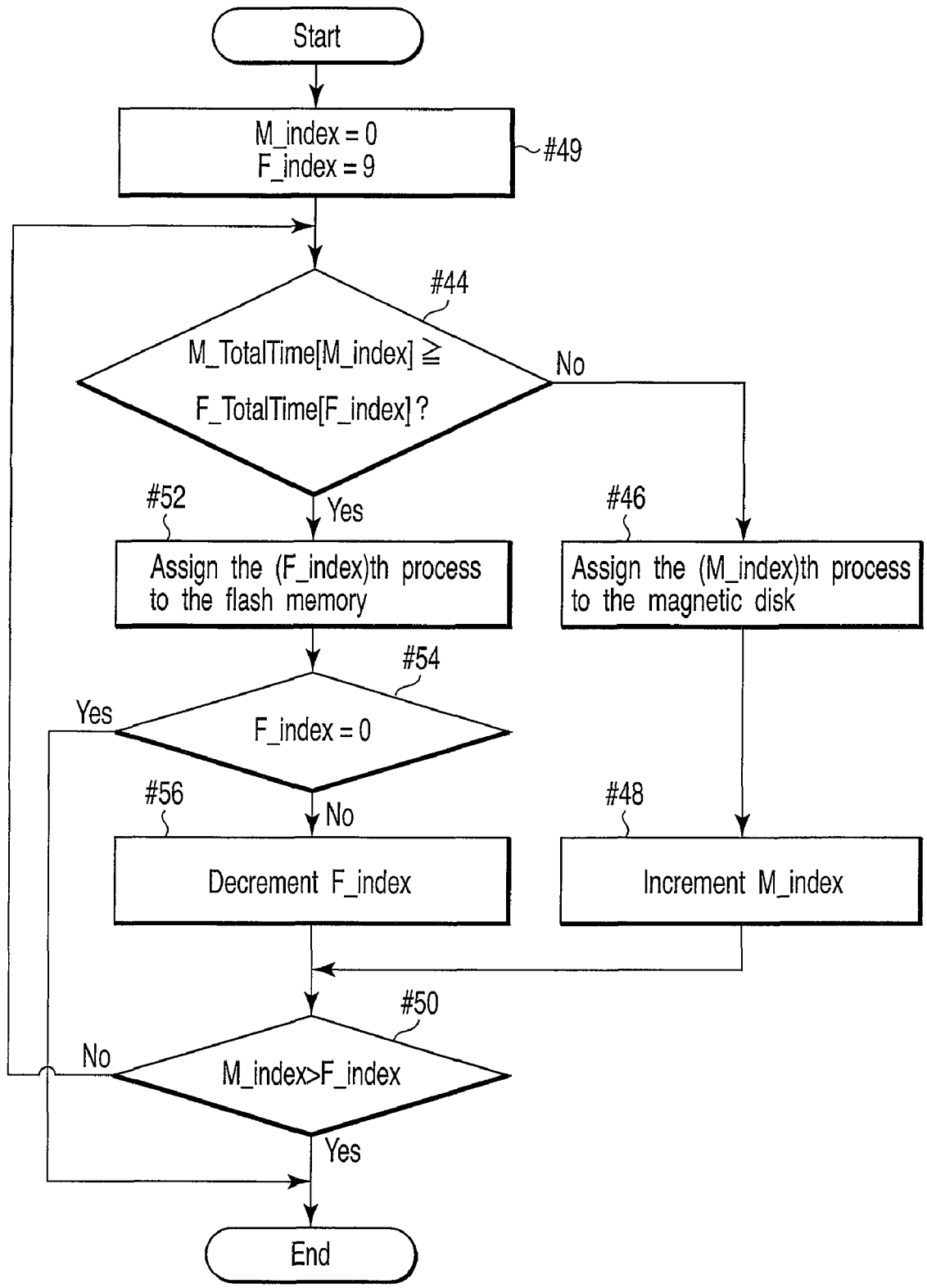
FIG. 4 is an exemplary flowchart explaining the sequence of selecting a medium into which data should be written flush by using the command-queuing table.

FIG. 4 is a flowchart explaining the sequence of selecting a medium into which data should be written flush by using the command-queuing table formulated as explained with reference to FIG. 3. Assume that ten commands are registered in the queuing table.

In block #42, the initial value of the disk-process order M_index is set to 0, and the initial value of the memory-process order F_index is set to 9.

In block #44, the cumulated time M_TotalTime[M_index] registered as the (M_index)th item is compared with the cumulated time F_TotalTime[F_index] registered as the (F_index)th item in the queuing table. If the cumulated time M_TotalTime[M_index] is equal to or longer than the cumulated time F_TotalTime [F_index], the flow goes to block #52, in which the write flush of the (F_index)th write command is assigned to the flash memory 30. Then, in block #54 it is determined whether F_index has become 0. If F_index has become 0, the write flush of all commands has been assigned to the medium. In this case, the process is terminated. If F_index has not become 0, the process goes to block #56, in which F_index is decremented. The process then goes to block #50.

In block #44, if the cumulated time M_TotalTime [M_index] is shorter than the cumulated time F_TotalTime [F_index]. If this is the case, the process goes to block #46. In block #46, the write flush of the (M_index)th write command is assigned to the magnetic disk 9. In block #48, M_index is incremented. The process then goes to block #50.

In block #50 it is determined whether M_index is longer than F_index. If M_index is not longer than F_index, the process returns to block #44. In block #44, the cumulated time M_TotalTime[M_index] for disk-processing is compared with the cumulated time F_TotalTime[F_index] for memory processing.

Thus, the write flush of write commands is assigned to the media as shown in FIG. 2D.

FIG. 5 is a diagram schematically explaining the command distributed processing described above. FIG. 2D shows the command-queuing table in which the commands are arranged so that they may be written back on only the magnetic disk 9 in the shortest time possible. Of the commands shown in this table, those registered at higher positions can be processed at highs speed on the magnetic disk 9. The other commands, which are registered at lower positions in the table, cannot be processed at high speed on the magnetic disk 9 but can be written in a short time if written flush back into the flash memory 30. As shown in FIG. 5, the logic addresses LBAs and the number of transfer blocks BLKs are also registered in the command-queuing table.

To write the write commands from the flash memory 30 back onto the magnetic disk 9, they are registered in the queuing table stored in the buffer RAM 4 (which is usually used when the hard disk drive receives a Flush Cache command or a Standby command from the host system 1). Then, the data stored in the flash memory 30 and pertaining to the commands registered in the queuing table is written back onto the magnetic disk 9. The data items need not be written back onto the disk 9 in such an order that they can be processed in the shortest time possible. Rather, they can be written back onto the disk 9 in a random order. At this point, cache commands are stored in the flash memory (nonvolatile memory) 30. Hence, the cache commands will not be erased even if a power-supply shutdown takes place. The cache commands can therefore be written back onto the magnetic disk 9, if necessary as described in the related control program.

As has been described, in the first embodiment, the write commands issued from the host system 1 are registered in the command-queuing table stored in the buffer RAM 4, and the data related to the commands is registered in the data table also stored in the buffer RAM 4. In accordance with the write commands registered in the command-queuing table, write flush is performed, writing the data registered in the data table, back onto the magnetic disk 9 or into the flush memory 30. The "commands that can be processed at high speed" with a minimum motion of the head 13 from the present position are written flush on the magnetic disk 9. All other commands are written flush in the flash memory 30. Thus, the write flush on the magnetic disk 9 and the write flush in the flash memory 30 can be performed in parallel or at the same time. The write flush can be completed in a shorter time than otherwise. If write flush is performed on two media at the same time, the overall write-flush time can be half.

The commands cached in a volatile memory can be written flush both on a magnetic disk and in a nonvolatile memory. Hence, the write flush can be accomplished in a short time. Further, the possibility of data destruction due to impacts the disk drive receives during the write flush is low.

The present invention is not limited to the embodiment described above. It can be reduced to practice in the form of various modifications. For example, which medium, the magnetic disk or the flash memory, should be used for write-flushing need not be determined in accordance with which is longer, the cumulated time required for write flush on the magnetic disk or the cumulated time required for write flush in the flash memory, as in the embodiment. Further, the commands that can be processed at high speed and the other commands may be determined by using any other algorithm.

In the embodiment described above, cached write commands are divided into two groups, and the magnetic disk and the flash memory are selected as write-flush media for these groups, respectively. In addition, the control program (firmware) may be altered to support two modes, one mode (1) of achieving the write flush on the magnetic disk 9 only, and the other mode (2) for achieving the write flush in the flash memory 30 only. Then, the user can select the first mode (1) or the second mode (2) in accordance with the purpose for which he or she uses the hard disk drive. More specifically, the user selects the first mode (1) if he or she wants to detect a trouble, if any, in the flash memory 30 or to save data reliably on the disk 9 only, at the expense of the low writing speed. The user selects the second mode (2) if he or she wants to save data quickly because the power supply may possibly be shut down or if the data processing must be performed at high speed because the accessible area is limited in the magnetic disk 9.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
a magnetic disk;
a nonvolatile memory;
a volatile memory configured to store write commands supplied from a host system and data accompanying the write commands; and
a first flush control unit configured:
to arrange the write commands stored in the volatile memory, in such an order that the write commands may be written at a highest efficiency possible, to store into the nonvolatile memory a time required to write each of the write commands stored in the volatile memory on the magnetic disk, a cumulated time required to write the write commands on the magnetic disk in a forward order starting with a first command, a time required to write each of the write commands stored in the volatile memory to the nonvolatile memory, and a cumulated time required to write the write commands to the nonvolatile memory in a reverse order starting with a last command, to classify a command for which the cumulated time required to write the write commands on the magnetic disk is longer than the cumulated time required to write the write commands to the nonvolatile memory into a second group of commands, to classify a command for which the cumulated time required to write the write commands on the magnetic disk is not longer than the cumulated time required to write the write commands to the nonvolatile memory into a first group of commands, to write the data accompanying the first group of commands to the magnetic disk, and to write the second group of commands and the data accompanying the second group of commands to the nonvolatile memory.

2. The magnetic disk apparatus according to claim 1, further comprising a second flush control unit configured to read the second group of commands stored in the nonvolatile memory by the first flush control unit and to write data accompanying the second group of commands on the magnetic disk.

3. A control method for a magnetic disk apparatus comprising a magnetic disk, a nonvolatile memory, and a volatile memory configured to store write commands supplied from a host system and data accompanying the write commands, the method comprising:

arranging the write commands stored in the volatile memory, in such an order that the write commands may be written at a highest efficiency possible, storing into the nonvolatile memory a time required to write each of the write commands stored in the volatile memory on the magnetic disk, a cumulated time required to write the write commands on the magnetic disk in a forward order starting with a first command, a time required to write each of the write commands stored in the volatile memory to the nonvolatile memory, and a cumulated time required to write the write commands to the nonvolatile memory in a reverse order starting with a last command, classifying a command for which the cumulated time required to write the write commands on the magnetic disk is longer than the cumulated time required to write the write commands to the nonvolatile memory being classified into a second group of commands, classifying a command for which the cumulated time required to write the write commands on the magnetic disk is not longer than the cumulated time required to write the write commands to the nonvolatile memory being classified into a first group of commands, writing the data accompanying the first group of commands to the magnetic disk, and writing the second group of commands and the data accompanying the second group of commands to the nonvolatile memory.

4. The control method according to claim 3, further comprising reading the second group of commands from the nonvolatile memory; and writing data accompanying the second group of commands on the magnetic disk.

* * * * *